Nov. 14, 1939.   L. B. MILLER   2,179,946
RAKE CLEANER
Filed May 9, 1938
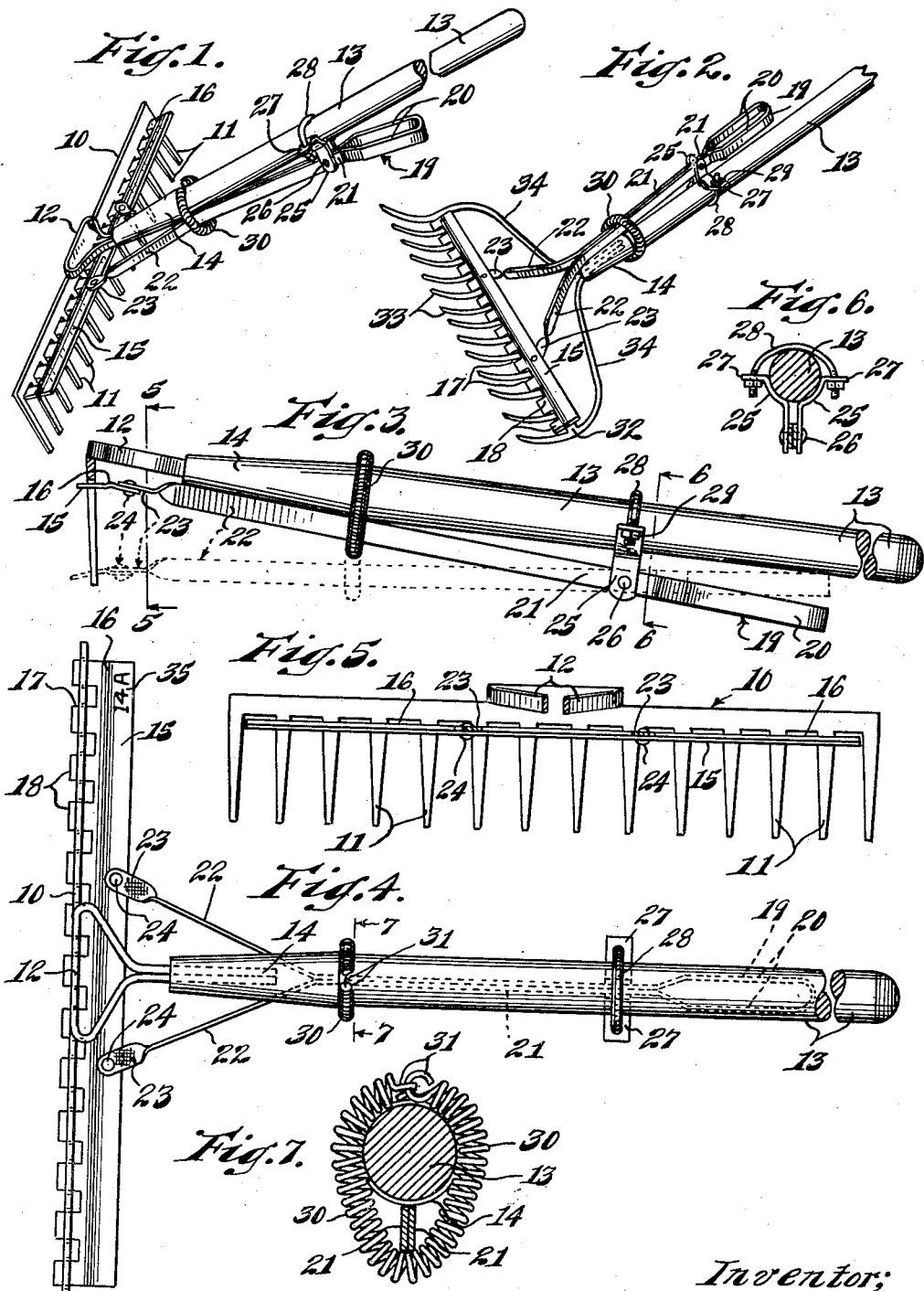
Witnesses:
E. E. Wessels
Aasta E. Mateen
Inventor:
Leo B. Miller,
By Joshua R. H. Potts
his Attorney.

Patented Nov. 14, 1939

2,179,946

UNITED STATES PATENT OFFICE 2,179,946

RAKE CLEANER

Leo B. Miller, Chicago, Ill.

Application May 9, 1938, Serial No. 206,772

2 Claims. (Cl. 55—146)

My invention relates to a rake cleaner or device designed as an attachment for rakes and adapted to be applied to a rake handle and head for cleaning the teeth or tines thereof of accumulated debris or rubbish such as fertilizer, leaves, grass, weeds, paper, etc., which is pierced by the tines or collects and clogs up on and between the teeth and at the crotch portions between the teeth, the device permitting the same to be quickly removed or cleaned in one sweeping movement between the crotch portions of the rake teeth and extremities of the tines, thus obviating the unsanitary practice of cleaning the rake by hand and the necessity of removing the debris by a stick or bringing the hands in contact with such collected matter.

Another object of the invention is to provide a rake cleaner which, with slight modification, may be easily applied to any rake irrespective of the length of the rake head and the number of teeth.

Other objects and advantages will become apparent and be brought out more fully in the following specification, reference being had to the accompanying drawing, wherein:

Fig. 1 is a perspective view of a rake having straight teeth with the rake cleaner attachment applied thereto;

Fig. 2 is a similar view in an inverted position showing the device applied to a rake having curved teeth;

Fig. 3 is an enlarged side elevation;

Fig. 4 is a plan view;

Fig. 5 is a section taken on the line 5—5 of Fig. 3;

Fig. 6 is a sectional view taken on the line 6—6 of Fig. 3; and

Fig. 7 is an enlarged section taken on the line 7—7 of Fig. 4.

Referring more particularly to the drawing, 10 designates a rake head having straight teeth or tines 11 and a shank portion 12 at which a handle 13 is applied at one end by a ferrule 14 shown as of tapered formation. The cleaner comprises a scraper bar 15 preferably made of hardened sheet steel and formed with a stiffening rib 16 pressed longitudinally thereof intermediate its longitudinal edges so that said rib or bead projects upwardly. The front edge is provided with a series of recesses 17 producing spaced teeth or scraper portions 18 adapted to project between the teeth or tines 11 of the rake head and preferably so that the opposite edges of the scraping portions 18 will lie in close proximity or scrape against the opposite edges of the teeth 11.

The scraper bar 15 is positioned horizontally at the back of the rake head and provides a piece movable between the crotch portions of the head to the extremities or tips of the teeth. For this purpose, a handle 19 is connected to the bar and, as shown, the handle comprises a strap doubled on itself intermediately with the portions adjacent to the bend spaced apart to form the gripping portion of the handle, as indicated at 20. These portions are then brought together in contact, as indicated at 21, and at their free end portions branch outwardly as indicated at 22 so as to be presented edgewise to the handle 13 of the rake, and the ends are then twisted horizontally at right angles as indicated at 23 to be riveted or otherwise fastened, as indicated at 24, at spaced points equidistant from the transverse center of the scraper or cleaner bar 15.

The fastening means 24 may be riveted, welded, or otherwise secured and the portions 23 are preferably located at the top of the bar 15 in back of the stiffening rib or bead 16.

In order to pivotally mount the device on the handle 13 of the rake, to permit the cleaner bar 15 to move over the teeth of the rake, the contacting portions of the handle adjacent the gripping portion are provided with registering apertures through which a pair of angular straps or bracket arms 25 having spaced arms are riveted or otherwise secured, as indicated at 26 forming a pivot connection spaced from the rake handle, and curved to fit the curvature of the handle 13 at the bottom and then branching outwardly to form ears 27 in horizontal relation. These oppositely extending or branching portions are apertured and receive a U-bolt 28 against the top of the handle 13 so that the legs will extend through the apertured ears 27 and engaged by nuts 29 to firmly clamp the same to the handle of the rake and provide a fixed pivot support for the handle or lever 19 beneath the rake handle.

A coiled spring 30 is provided with hooks or eyes 31 at its extremities interengaged in continuous or looped form to mount the same around the rake handle and also around the lever or handle 19, on which latter part it is conveniently mounted and retained when sold so as to be slipped over the rake handle with the clamp when attached to a rake, although the clamp may be disassembled and applied in assembled relation, if desired.

It is to be understood that the device is relatively short compared to the length of the rake handle and is applied close to the head of the rake, the spring 30 serving to hold the scraper or cleaner bar to the upper part of the teeth, that is, against or in close proximity to the crotch portions with the spring applied around the handles of the rake and cleaner in the manner described. This will cause the gripping portion of the cleaner to move on its pivot 26 in spaced relation to the rake handle in the manner clearly shown in Figs. 1, 2 and 3 of the drawing and particularly the full line position shown in Fig. 3. Thus, by gripping the handles and pressing the handle of the cleaner against the handle of the rake, the scraper bar or piece will be moved over the teeth of the rake to a point adjacent the free ends thereof as shown in dotted lines in Fig. 3, and since this will expand the spring 30, when the pressure is released, the cleaner will return to its normal position.

The spring 30, as shown, is engaged around the handles adjacent to the ferrule 14 and, therefore, acts at some distance from the pivot 26 so that, owing to the leverage provided, a relatively light spring may be employed which also serves to hold the parts in assembled relation.

In Fig. 2 of the drawing, the construction and operation of the cleaner is the same as just described. The only difference is that in this view, the device is shown applied to a rake head 32 having curved teeth or tines 33 and portions 34 branching from the ends of the rake head for connection to the handle 13 of the rake beneath the ferrule 14 instead of having the portions 12 stripped from the ends of the rake head 10 and then bent to form a shank portion for attachment to the handle 13 beneath the ferrule 14, as shown in the other figures. The operation of the cleaner in this form is the same.

It will also be obvious that the device saves time and does away with cleaning the rake by hand, which is a very unsanitary practice. It is unnecessary to waste time and take the chance of getting an infection from rubbish, leaves, fertilizer, etc., picked up on a rake.

A slight pressure on the handle moves the scraper between the teeth in a downward motion to the tip of the teeth, thus removing all debris accumulated on the teeth of the rake. The coiled spring around the handle of the rake pulls and holds the scraper of the cleaner to the upper part of the teeth out of the way where it will not hinder in raking.

The device is easily applied to any rake and the cost is very low. To determine which model of the various sizes in which the device is made, as designated at 35, will fit a particular rake, it is only necessary to know the length of the rake head, that is, the distance across the rake and the number of teeth, the number of recesses 17 and the spacing of the teeth or scraping portions 18 being arranged accordingly.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is as follows:

1. A cleaner attachment for rakes comprising a scraper bar having a notched edge forming scraper portions, a handle rigid with said bar and comprising a strap doubled on itself to provide spaced gripping portions, intermediate contacting portions and branching ends, said branching ends being secured to the bar to hold the intermediate portions in contact with each other, a clip to which the handle is pivoted adjacent the gripping portions, said clip comprising angular brackets having spaced arms supporting a pivot connection spaced from the rake handle and curved portions to fit a rake handle terminating in outwardly branching ears, a U-bolt adjustably connected to the ears over the top of the rake handle to attach the same to the rake handle, and a looped coiled spring loose on the handle of the cleaner adapted to engage around the rake handle to hold the cleaner handle against the rake handle, the bar against the rake head and the gripping portions spaced from the rake handle.

2. A rake cleaner comprising a handle member consisting of a strap doubled on itself intermediately with portions adjacent the bend spaced apart to form a gripping member, then brought together in contact and their free ends branching outwardly and twisted horizontally at right angles for connection with a cleaner bar, said bar having rake teeth engaging portions, a coil spring looped on the contacting portions of the handle and a clip having angular members between which said contacting portions are pivoted and having outstanding ears at right angles thereto for receiving a U-bolt to clamp the device beneath a rake handle.

LEO B. MILLER.